United States Patent [19]
Hashimoto et al.

[11] Patent Number: 5,268,929
[45] Date of Patent: Dec. 7, 1993

[54] METHOD OF EFFECTIVELY NORMALIZING AN AUTOMATIC EQUALIZER IN MULTIPOINT DATA COMMUNICATIONS SYSTEM AND ARRANGEMENT THEREOF

[75] Inventors: Akira Hashimoto, Tokyo; Hitoshi Katayama, Shizuoka, both of Japan

[73] Assignee: NEC Corporation, Japan

[21] Appl. No.: 769,134

[22] Filed: Sep. 30, 1991

[30] Foreign Application Priority Data

Sep. 28, 1990 [JP]  Japan ................................. 2-259810

[51] Int. Cl.⁵ ........................ H03H 7/30; H03H 7/40
[52] U.S. Cl. ...................................... 375/13; 375/109
[58] Field of Search ............. 375/13, 109, 12, 8; 370/110.2, 110.3; 333/28 R, 28 T, 18; 379/97

[56] References Cited

U.S. PATENT DOCUMENTS 4,044,307  8/1977  Borysiewicz et al. ................ 375/13
4,995,057  2/1991  Chung .................................... 375/13

*Primary Examiner*—Curtis Kuntz
*Assistant Examiner*—Tesfaldet Bocure
*Attorney, Agent, or Firm*—Ostrolenk, Faber, Gerb & Soffen

[57] ABSTRACT

In order to improve the rapidity with which an automatic equalizer can be pulled in when transmitting data at high baud rates, each of the modems of secondary stations are arranged to detect the divergence of the automatic equalizer included therein and induce the issuance of a tone signal which is supplied to the primary station and induces the latter to reissue a training signal. The automatic equalizers in the secondary stations pull in on the training signal which ceases to be issued when the tone signal is no longer generated.

4 Claims, 2 Drawing Sheets

METHOD OF EFFECTIVELY NORMALIZING AN AUTOMATIC EQUALIZER IN MULTIPOINT DATA COMMUNICATIONS SYSTEM AND ARRANGEMENT THEREOF

BACKGROUND OF THE INVENTION

1. Field of the Invention

The present invention relates generally to a method and arrangement of restoring normal operation of a data terminal equipment(s) in a multipoint data communications system, and more specifically to such a method and arrangement wherein a training signal is requested in the event of divergence of an automatic equalizer of the data terminal equipment.

2. Description of the Prior Art

It is known in the art that in a multipoint data communications system, a single primary station is connected to two or more secondary stations. The primary station is able to send data that is addressed to one or more of the secondary stations. However, a secondary station is permitted to send data only to the primary station; and one secondary station is unable to send data to another of the secondary stations. Each of the primary and secondary stations includes, a data terminal equipment (DTE) such as a computer and a modem which is coupled thereto. The primary and secondary stations are interconnected via a public switched telephone network or dedicated telephone lines.

In the event that an automatic equalizer of one secondary station diverges due to degradation of transmission path and hence is no longer able to normally operate, it is vital to normalize, as early as possible, the operation of the automatic equalizer rendered inoperative.

According to a known method of restoring the operation of an automatic equalizer which has been rendered inoperative due to divergence thereof, the modem including the equalizer in question acquires data which are exchanged between the primary station and one of the other normal secondary stations. In more specific terms, the secondary station, which includes an automatic equalizer in divergence condition, adjusts its own automatic equalizer using the acquired communications signals, and establishes regular communications with the primary station.

The above-mentioned known technique has been found suitable for the communication speed up to as high as 9,600 bps (bits per second) for example. However, in the case of the communication speed of more than 19,200 bps, the prior art has encountered the difficulty that a large amount of time is undesirably required to pull in or converge an automatic equalizer.

SUMMARY OF THE INVENTION

It is an object of the present invention to provide a method of rapidly normalizing an automatic equalizer in a secondary station in divergence condition by issuing a tone signal to a primary station and receiving a training signal therefrom.

Another object of the present invention is to provide an arrangement of rapidly normalizing an automatic equalizer in a secondary station in divergence condition by issuing a tone signal to a primary station and receiving a training signal therefrom.

In brief, the above objects are achieved by a method and arrangement wherein, in order to improve the rapidity with which an automatic equalizer can be pulled in when transmitting data at high baud rates, each of the modems of secondary stations are arranged to detect the divergence of the automatic equalizer included therein and induce the issuance of a tone signal which is supplied to the primary station and induce the latter to reissue a training signal. The automatic equalizers in the secondary stations pull in on the training signal which ceases to be issued when the tone signal is no longer generated.

More specifically a first aspect of the present invention is deemed to come in an arrangement of a communication system which comprises; a primary station which includes means for issuing a training signal; a secondary station which includes; an automatic equalizer which is responsive to the signal issued by the primary station; and an automatic equalizer divergence detector which is coupled between the automatic equalizer and a sine wave generator, the automatic equalizer divergence detector inducing the sine wave generator to output a tone signal in response to a predetermined amount of divergence being detected, the tone signal from the sine wave generator being supplied back to a sine wave detector included in the primary station, the primary station including means responsive to the detection of the tone signal for inducing the training signal issuing means to issue a training signal to the secondary station.

A second aspect of the present invention is deemed to come in a method of restoring normal operation of an automatic equalizer in a multipoint data communications system, the multipoint data communications system including a primary station and a plurality of secondary stations which are interconnected to the primary station, the automatic equalizer forming part of each of the secondary stations, the method comprising the steps: (a) detecting divergence of the automatic equalizer at one of the secondary stations; (b) inducing issuance of a tone signal in response to the detection of the divergence of the automatic equalizer; (c) applying the tone signal to the primary station; (d) inducing the primary station to issue a training signal; and (e) applying the training signal from the primary station to the secondary stations.

A third aspect of the present invention is deemed to come in a method of restoring normal operation of an automatic equalizer in a multipoint data communications system, the multipoint data communications system including a primary station and a plurality of secondary stations which are interconnected to the primary station, the automatic equalizer forming part of each of the secondary stations, the method comprising the steps; (a) detecting divergence of the automatic equalizer at one of the secondary stations; (b) inducing issuance of a tone signal in response to the detection of the divergence of the automatic equalizer; (c) applying the tone signal to the primary station; (d) inducing the primary station to issue a training signal; (e) applying the training signal from the primary station to the secondary stations; (f) detecting convergence of the automatic equalizer which has been implemented using the training signal; (g) ceasing the issuance of the tone signal from the secondary station; and (f) ceasing the issuance of the training signal in the event that the primary station fails to detect the tone signal.

BRIEF DESCRIPTION OF THE DRAWINGS

The features and advantages of the present invention will become more clearly appreciated from the following description taken in conjunction with the accompanying drawings in which.

DETAILED DESCRIPTION OF THE PREFERRED EMBODIMENTS

Figure 1:
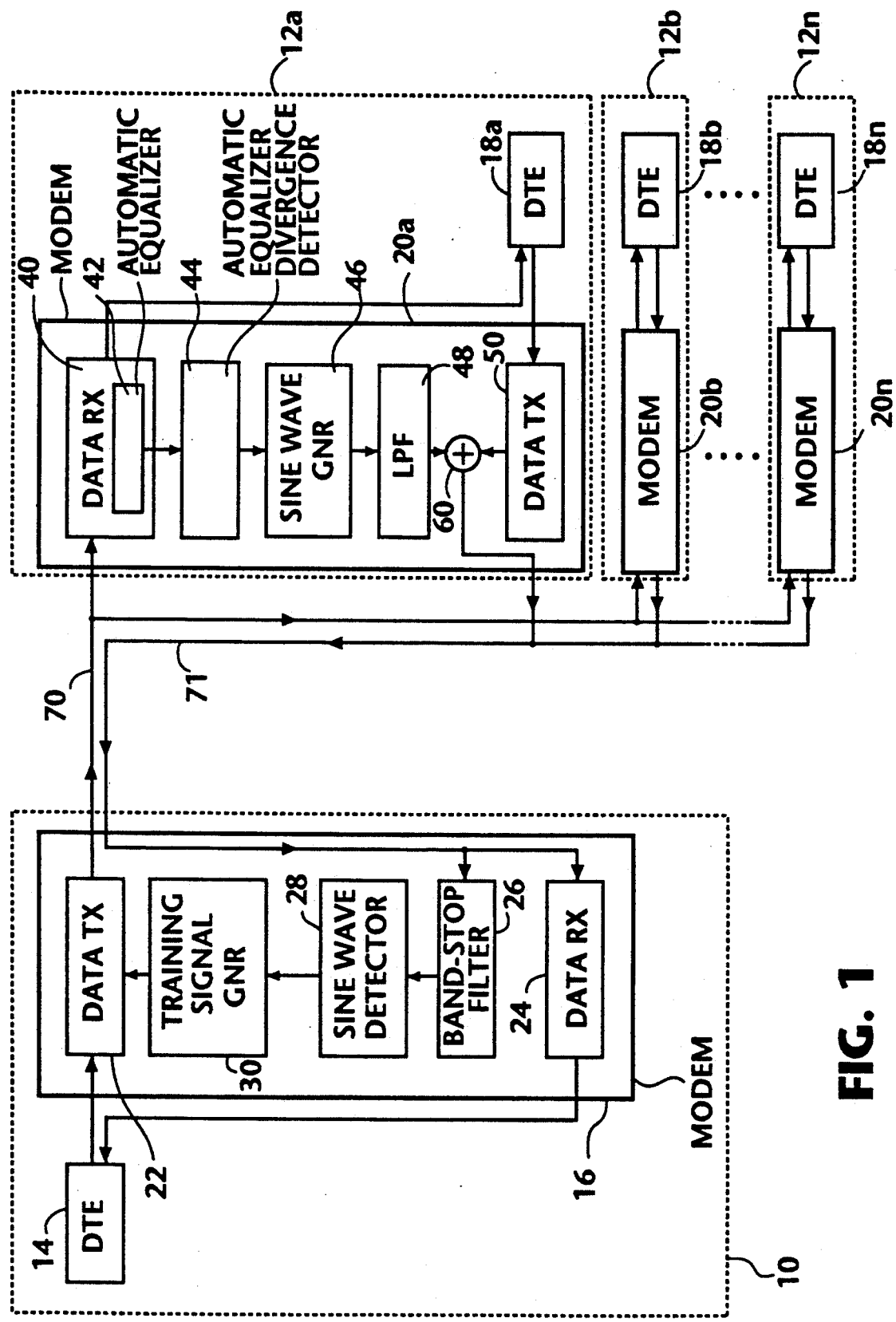
FIG. 1 is a block diagram showing one embodiment of the present invention.

Reference is made to FIG. 1, wherein an embodiment of the present invention is shown in block diagram form. The arrangement illustrated in FIG. 1 is a multipoint data communication system and is comprised of a single primary station 10 which is interconnected to a plurality of secondary stations 12a, 12b, . . . , 12n via dedicated telephone lines 70, 71 in this particular case.

As referred to in the opening paragraphs, the primary station 10 is able to transmit data to one or more of the secondary stations 12a-12n. The secondary stations 12a-12n are unable to send data between one another.

The primary station 10 generally includes a data terminal equipment (DTE) 14 and a modem 16, while the secondary station 12a includes a DTE 18a and a modem 20a. As is well known, each of the modems 16a and 20a converts binary signals produced by the corresponding DTE and also reverses the process when analog signals are applied thereto.

Similarly, the next secondary station 12b includes a DTE 18b and a modem 20b, while each additional secondary station 12n is provided with a DTE 18n and a modem 20n. Each of the secondary stations 12b-12n is configured in a manner identical with the station 12a and, hence the details of each of the stations 12b-12n are not illustrated for the sake of simplicity.

The modem 16 of the primary station 10 includes a data transmitter 22, a data receiver 24, a band-stop filter 26, a sine wave detector 28, and a training signal generator 30, all of which are coupled as shown. The sine wave detector 28 is adapted to ascertain a sine wave (viz., tone signal) transmitted from at least one secondary station.

The secondary station 12a includes, a data receiver 40 having therein an automatic equalizer 42, an automatic equalizer divergence detector 44, a sine wave generator 46, a low-pass filter (LPF) 48, a data transmitter 50, and and adder 60.

It should be noted that the circuit configurations of all the blocks in FIG. 1 and the operations thereof are known in the art. Accordingly, further discussion will be deemed unnecessary.

Figure 2:
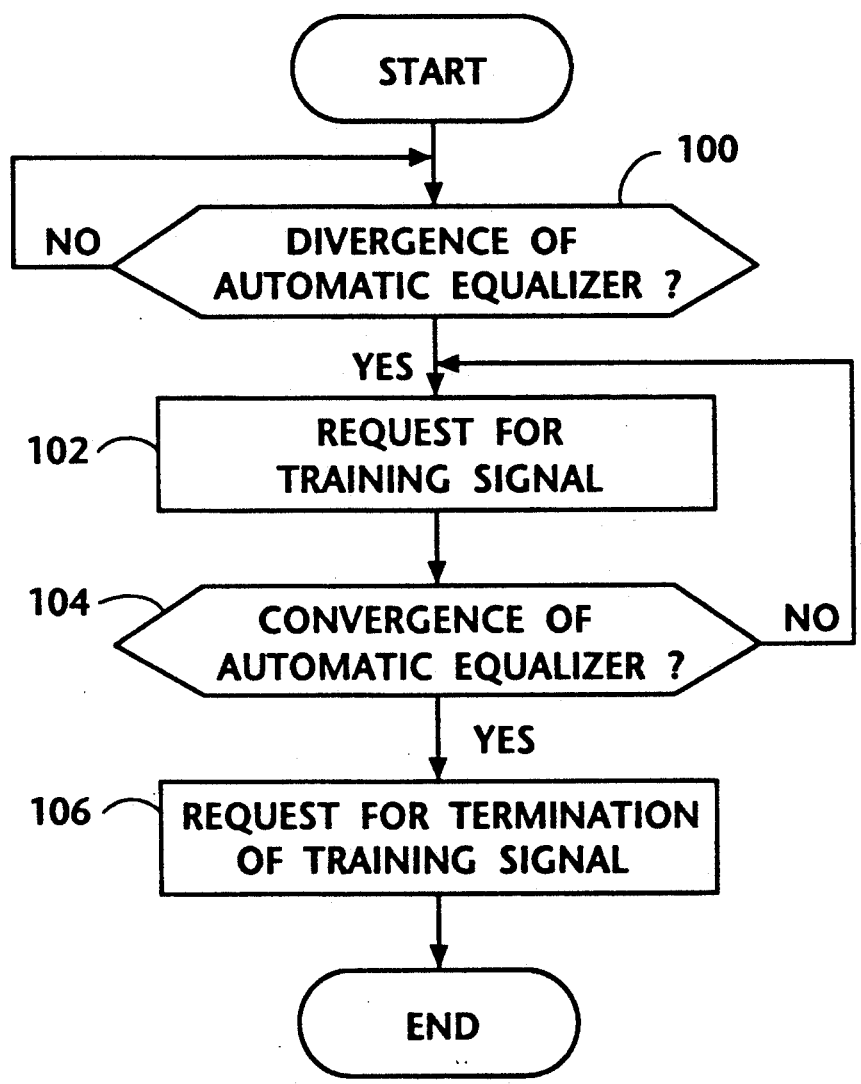
FIG. 2 is a flowchart showing the manner in which the operations of the FIG. 1 embodiment are executed.

The operation of the FIG. 1 arrangement will be discussed with reference to the flowchart illustrated in FIG. 2.

Before actual data communications between the primary station 10 and the secondary stations 12a-12n, the station 10 issues a training signal which is applied to the stations 12a-12n via a transmission channel 70. Thus, each of the automatic equalizers in the secondary stations 12a-12n, is initially adjusted using the training signal applied thereto. It is assumed that, while the primary station 10 continues to operate normally with the secondary stations 12a-12n after the initial equalizer adjustment, the automatic equalizer 42 of the modem 20a falls into asynchronism or diverges due to degradation of the transmission path. In this case, the equalizer 42 no longer functions correctly and hence the communication between the primary and secondary stations 10, 12a is interrupted.

In the event that the automatic equalizer 42 diverges, the detector 44 detects the divergence of the equalizer 42 using known techniques and produces a detection signal (step 100). The sine wave generator 46, in response to the divergence detection signal, generates a sine wave signal (viz., tone signal) which is applied to the sine wave detector 28 of the primary station 10 by way of the adder 60, a transmission path 71 and a band-stop filter 26 in this order (step 102). When the sine wave issued from the generator 46 of the secondary station 12a is detected at the sine wave detector 28, the training signal generator 30 produces a training signal in response to an output of the detector 28. The data transmitter 22 of the primary station 10 sends the training signal to all of the secondary stations 12a-12n.

The automatic equalizer 42 of the secondary station 12a is adjusted using the training signal as in the initial stage of the system operation. When the equalizer 42 converges, the divergence detector 44 no longer detects the divergence of the equalizer 42 and, accordingly, terminates the issuance of the sine wave or tone signal therefrom (steps 104, 106). If the sine wave detector 28 of the primary station 10 fails to detect the sine wave, the training signal generator 30 ceases to produce the training signal.

While the foregoing description describes a single embodiment according to the present invention, the various alternatives and modifications possible without departing from the scope of the present invention, which is limited only by the appended claims, will be apparent to those skilled in the art.

What is claimed is:

1. In a communication system;
    a primary station which includes means for issuing a training signal;
    a secondary station which includes:
    an automatic equalizer which is responsive to the training signal issued by the primary station; and
    an automatic equalizer divergence detector which is coupled between said automatic equalizer and a tone signal generator, said automatic equalizer divergence detector inducing said tone signal generator to output a tone signal in response to a predetermined amount of divergence of said automatic equalizer being detected;
    the tone signal from the tone signal generator being supplied back to a tone signal detector including in said primary station, which is responsive to the detection of the tone signal for inducing said training signal issuing means to issue a training signal to the secondary station.

2. A method of restoring normal operation of an automatic equalizer in a multipoint data communication system, the multipoint data communications system including a primary station and a plurality of secondary stations which are interconnected to the primary station, the automatic equalizer forming part of each of the secondary stations, said method comprising the steps of:
    (a) detecting divergence of the automatic equalizer at one of the secondary stations;
    (b) inducing issuance of a tone signal in response to the detection of the divergence of the automatic equalizer;
    (c) applying the tone signal to the primary station;

(d) inducing the primary station to issue a training signal in response to said tone signal; and (e) applying the training signal from the primary station to the secondary stations.

3. A method as claimed in claim 2, further comprising the following steps after step (e):

(f) detecting convergence of the automatic equalizer which has been implemented using the training signal;

(g) ceasing the issuance of the tone signal from the secondary station in response to detecting convergence in step (f); and (h) ceasing the issuance of the training signal in the event that the primary station fails to detect the tone signal.

4. A method of restoring normal operation of an automatic equalizer in a multipoint data communication system, the multipoint data communication system including a primary station and a plurality of secondary stations which are interconnected to the primary station, the automatic equalizer forming part of each of the secondary stations, said method comprising the steps of:

(a) detecting divergence of the automatic equalizer at one of the secondary stations;

(b) inducing issuance of a tone signal in response to the detection of the divergence of the automatic equalizer;

(c) applying the tone signal to the primary station;

(d) inducing the primary station to issue a training signal in response to said tone signal;

(e) applying the training signal from the primary station to the secondary stations;

(f) detecting convergence of the automatic equalizer which has been implemented using the training signal;

(g) ceasing the issuance of the tone signal from the secondary station in response to detecting convergence in step (f); and (h) ceasing the issuance of the training signal in the event that the primary station fails to detect the tone signal.

* * * * *